(12) United States Patent
Ellsworth

(10) Patent No.: US 6,360,729 B1
(45) Date of Patent: Mar. 26, 2002

(54) ACTIVE FUEL SYSTEM BLADDER

(75) Inventor: Eric D. Ellsworth, Ypsilanti, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/621,289

(22) Filed: Jul. 20, 2000

(51) Int. Cl.$^7$ .............................................. F02M 33/02
(52) U.S. Cl. ..................... 123/518; 123/516; 220/723
(58) Field of Search ................................. 123/516, 519, 123/520, 521, 518, 198 D; 220/723, 721, 905, 4.14

(56) References Cited

U.S. PATENT DOCUMENTS

| | | | |
|---|---|---|---|
| 3,409,714 A | | 11/1968 | Strugar, Jr. |
| 3,701,540 A | | 10/1972 | Pringle |
| 3,747,800 A | | 7/1973 | Viland |
| 3,949,720 A | * | 4/1976 | Zipprich et al. ............ 123/518 |
| 3,977,379 A | | 8/1976 | Weissenbach |
| 5,056,493 A | | 10/1991 | Holzer |
| 5,115,638 A | * | 5/1992 | Reed et al. ............... 60/39.281 |
| 5,596,971 A | | 1/1997 | Kidokoro |
| 5,722,374 A | | 3/1998 | Kidokoro et al. |
| 5,746,185 A | | 5/1998 | Kidokoro et al. |
| 5,868,120 A | | 2/1999 | Van Wetten et al. |
| 6,260,544 B1 | * | 7/2001 | Spry et al. .................. 123/516 |

\* cited by examiner

Primary Examiner—Carl S. Miller
(74) Attorney, Agent, or Firm—Carlos Hanze, Esq.

(57) ABSTRACT

An active bladder system and method for using same minimizes vapor formation in a fuel tank. A low-permeation, flexible conductive bladder (18) is contained within a fuel tank (12). The bladder (18) holds or contains the liquid fuel (25) in the fuel tank (12). The bladder (18) has air pressure applied to the outside of the bladder (18) to keep the bladder (18) against the fuel (25) to prevent vapor formation during engine running modes and diurnal cycles. A fuel delivery pump (23), external to the fuel tank, pressurizes the fuel to a desired pressure for use by an engine. The system is depressurized during refueling stages. Because vapor generation is minimized during running mode and diurnal cycles, no carbon canister or purge system is required by the present invention, resulting in cost savings and lower emissions levels. The present invention is compatible with conventional fueling infrastructures and may reduce fuel pump (23) current draw due to positive pressure on the bladder (18) during running modes. An additional thermal barrier (14) is added to the outside of the fuel tank (12) to further prevent vapor formation.

18 Claims, 1 Drawing Sheet

ACTIVE FUEL SYSTEM BLADDER

TECHNICAL FIELD

The present invention relates generally to fuel systems and more particularly to controlling vapor generation in fuel systems.

BACKGROUND

Known types of on-board fuel vapor management systems comprise a vapor collection canister that collects and stores fuel vapor emitted from a tank containing volatile liquid fuel for the engine. A canister purge solenoid (CPS) valve periodically purges collected vapor to an intake manifold of the engine where it entrains with induction air or with an induction air-fuel charge for combustion in the engine combustion chamber space. One type of CPS valve comprises a solenoid that is under the control of a microprocessor-based engine management system. Because vapor storage systems such as carbon canisters have a finite capacity to adsorb fuel vapor, fuel vapor may be periodically emitted into the atmosphere when vapor storage systems exceed adsorption capacity.

Other solutions have been proposed to reduce the tendency of fuel to vaporize. One way is by an enclosure, such as a bladder or diaphragm for example, arranged within a fuel tank to reduce the volume of vapor headspace in the tank. Another proposed solution is to pressurize the headspace to a superatmospheric pressure to reduce the volatility of the fuel. Yet another proposed solution, as described in U.S. Pat. No. 5,868,120 (the '120 patent), combines these two principles. In the '120 patent, a flexible bladder is placed within the fuel tank to reduce the volume of tank headspace that can be occupied by fuel vapor. A source of pressurized gas introduces gases within the bladder and within the headspace through a solenoid operated bladder pressure valve to pressurize the tank to superatmospheric pressure. In addition, a series of valves are available to vent the gas as needed. An engine control module controls the selective pressurizing and venting in accordance with various inputs.

In the '120 patent, however, vapor generation is attenuated, not eliminated. As such, in conditions where the pressure buildup within the headspace is high (above 27 inches of water as detected by sensor 98 in a preferred embodiment), a vent valve is opened to vent the air/fuel vapor mixture to a carbon canister, wherein the fuel vapor is stored. If the amount of fuel vapor in the canister exceeds the adsorption ability of the activated carbon pellets or other adsorbing material within the canister, fuel vapor may be vented into the atmosphere. Further, a purge system must be added to periodically purge the canister of fuel vapor.

Thus, it is highly desirable to create a fuel system that eliminates vapor generation during running modes and diurnal cycles (engine off mode) in the fuel tank. This would have the added benefit of eliminating the need a carbon canister and purge system.

SUMMARY OF THE INVENTION

The objects of the present invention are achieved by introducing a flexible, low-permeation conductive fuel bladder contained within a low or medium pressure vessel (or fuel tank) to hold liquid fuel. Air pressure, supplied by an air pump or comparable device, introduces air pressure to the outside of the bladder to keep the bladder against the fuel and to prevent vapor generation during running modes and diurnal cycles. Valves located within the tank may release pressure as needed. Sensors located within the system send information to an electronic control module regarding fuel level, tank pressure, battery voltage, air temperature, fuel pump speed, fuel filler door state, and fuel temperature. The electronic control module interprets these signals and instructs the system to selectively increase, decrease, or hold steady the pressure within the fuel system to maintain the bladder against the fuel based on the information received. A fuel delivery pump, external to the tank, pressurizes the fuel to a desired pressure to be used by an engine.

The present invention eliminates the need for a carbon canister or purge system to remove fuel vapor from the fuel system because the disclosed system works to eliminate fuel vapor generation during running modes and diurnal cycles. Further, the bladder system improves the safety features in a storage tank by adding a second barrier to the environment and improves safety by eliminating potentially harmful fuel vapor generation.

During refueling operations, the fuel cap is removed and the bladder system is returned to atmospheric pressure. The fuel nozzle is inserted through a mechanical seal in the refueling pipe. This minimizes refueling losses and prevents air from entering the system. When the refueling is accomplished, the system is repressurized if conditions require it by an electric or mechanical air pump to prevent vapor generation.

Further, in automotive applications, fuel vapor generation is minimized even when the engine is turned off, as the system is sealed and will remain pressurized to keep the bladder against the surface of the fuel.

The present invention adds little complexity to a fuel system and can be easily integrated into conventional fueling infrastructures.

While the present invention is ideally suited for use in automotive fuel tank systems, it is contemplated that this system may be used in a wide variety of settings where vapor generation can occur. This may include underground fuel storage tanks, stationary power sources, and portable power sources.

Other objects and advantages of the present invention will become apparent upon considering the following detailed description and appended claims, and upon reference to the accompanying drawings.

DESCRIPTION OF THE PREFERRED EMBODIMENTS(s)

Figure 1:
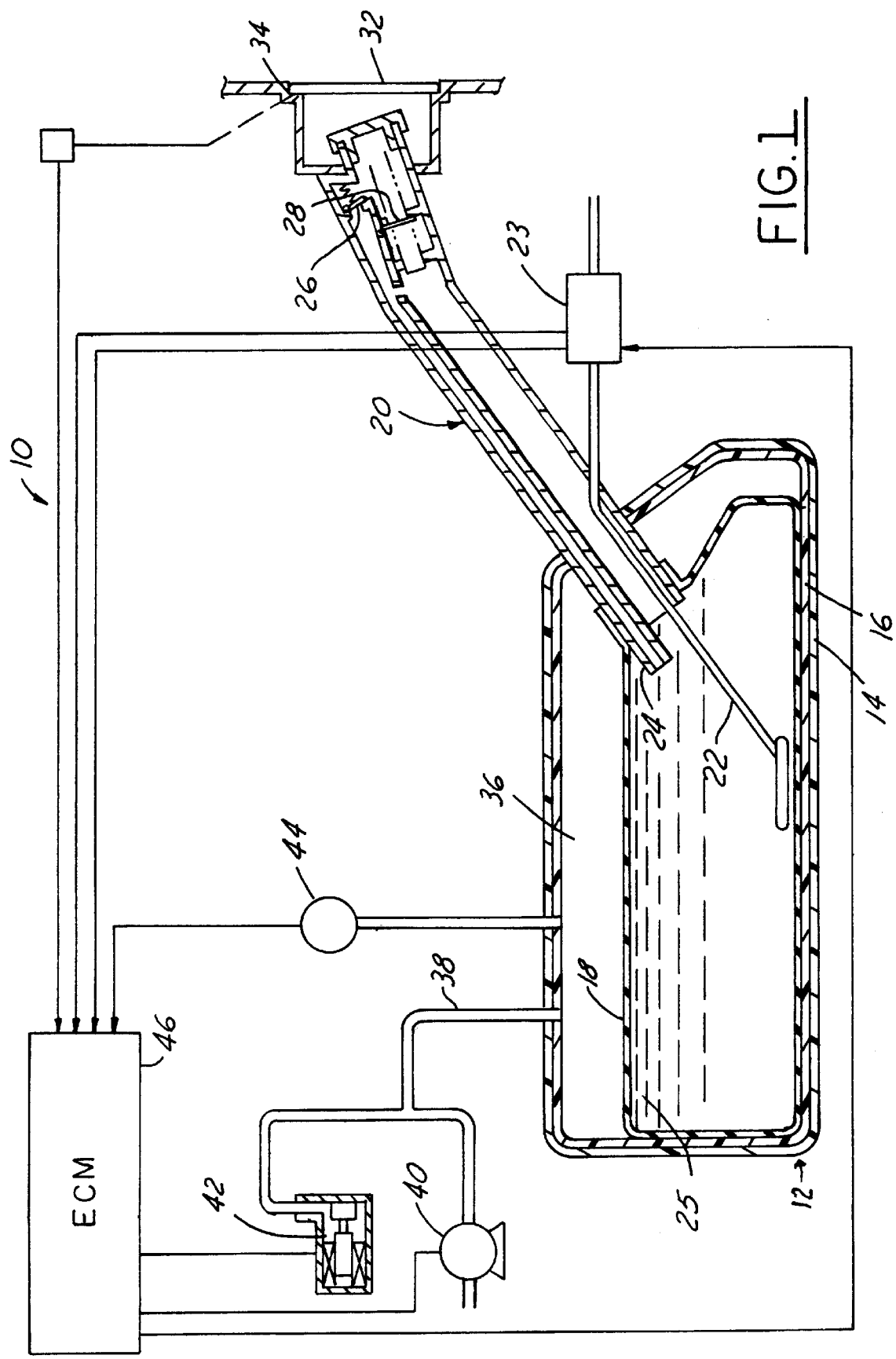
FIG. 1 is a perspective view of an active bladder fuel system according to a preferred embodiment of the present invention.

Referring now to FIG. 1, an active bladder fuel system 10 according to a preferred embodiment is illustrated. The system 10 contains a fuel tank 12. having an outer thermal barrier 14 and an inner container 16 composed of heavy gage metal, composite or plastic of sufficient shape to withstand air and fuel pressure and maintain its original shape. A flexible low-permeation conductive bladder 18 is placed inside the inner container 16. A refueling pipe 20 is hermetically affixed to the inner container 16 and the bladder 18. The refueling pipe 20 contains a fuel pickup 22 which extends within the bladder 18, a vapor recirculation tube 24 having a vent valve 26, a positive sealing retainer 28, a fuel cap 30, a fuel filler door 32, and a fuel filler door opening switch 34. The fuel pickup 22 is coupled to a demand fuel pump 23 for drawing fuel 25 out of the bladder 18 and pumping it to an engine (not shown) for combustion. A fuel level sensor (not shown) is contained within the system 10 for measuring fuel 25 levels within the bladder 18.

Between the bladder 18 and the inner container 16 is a space portion 36. An air pressure line 38 extends into the space portion 36 at one end and is coupled to an air pump 40 and a vent solenoid relief valve 42 at its other end. The air pump 40 may be an electrical air pump, a mechanical air pump or any other suitable pump. An air pressure sensor 44 is coupled to the fuel tank 12 to measure air pressure levels in the space portion 36.

The bladder 18 is preferably composed of a flexible material that exhibits low permeation rates to gasoline fuel blends and has the ability to dissipate an electrostatic charge. Once such preferable material is polytetrafluoroethylene (Teflon). However, the bladder 18 obviously can be comprised of a variety of other known materials. Pressure is applied by an air pump 40 to the space portion 36 of the fuel tank 12 to keep the bladder 18 against the fuel 25 to prevent vapor generation.

The present invention is controlled during all phases of a vehicle operation, including running modes, diurnal cycles (off-key mode), and refueling modes. The operation of the invention in each mode is described below.

During running modes, the controller 46 receives signals regarding fuel levels from the fuel level sensor (or as calculated by the controller 46 by known methods), battery voltage levels from the battery, air temperature readings from air temperature sensors, fuel temperature readings from a fuel temperature sensor (or calculated within the system by known methods), engine fuel demand based on current mode of operation (for example, idle speed or highway operation), fuel pump 23 speed, and tank pressure from the tank pressure sensor 44. Based on these inputs, the controller 46 determines the proper amount of air pressure required for the space portion 36 to keep the bladder 18 against the fuel 25 to prevent vapor formation within the bladder 18. The controller 46 directs the air pump 40 to pump more air for a predetermined period into the space portion 36 when more pressure is required based on the inputs. Conversely, the controller 46 will direct the vent solenoid relief valve 42 to open for a predetermined period to lower the pressure within the space portion 36 when less pressure is indicated based upon the inputs. To further aid the system 10 in reducing vapor formation, a thermal barrier 14 is added to the fuel tank 12 to insulate the fuel tank 12 from heat generated in the vehicle and from road surfaces.

As more fuel 25 leaves the bladder 18 through the fuel pickup 22 to be pumped to the engine by the fuel pump 23, more pressure is needed in the space portion 36 to ensure that the bladder 18 remains on the surface of the fuel 25 within the bladder to prevent vapor formation. As the speed of the vehicle increases, the speed of the fuel pump 23 correspondingly increases, causing more fuel 25 to flow through the fuel pickup 22. The controller 46 receives inputs regarding these changes and directs the air pump 40 to pump more air into the space portion 36 to maintain contact of the bladder 18 with the fuel 25.

When the engine is turned off (known as the diurnal cycle), pressure within the space portion 36 is maintained. To accomplish this, the vent solenoid relief valve 42 is closed and the air pump 44 is turned off. The air pressure in the space portion 36 will keep the bladder pressed against the fuel 25 to prevent vapor formation. When the vehicle is turned on, the system 10 functions as above in running mode.

During refueling, the fuel filler door 32 is opened. The fuel filler door opening switch 34 sends a signal to the controller 46 that the door 32 is opened, and the controller 46 directs the vent solenoid relief valve 42 to open and return the space portion 36 to atmospheric pressure. Then, fuel 25 may be dispensed into the bladder 18 through the refueling pipe 20. After opening the fuel cap 30, a fuel-dispensing nozzle (not shown) is inserted through the positive sealing retainer 28. Fuel 25 is dispensed through the nozzle into the bladder 18. Fuel vapor generated through this refueling process flows into the vapor recirculation tube 24. If the vapor pressure gets too high during refueling, a vent valve 26 may vent some vapor pressure from the system 10. When refueling is completed and the nozzle is removed, the cap 30 replaced, and the door 32 shut. The fuel filler door opening switch 34 sends a signal to the controller 46 that the door 32 is closed, the vent solenoid relief valve 42 is directed closed by the controller 46, and conditions are maintained as in the diurnal cycle until the vehicle is turned on.

The present invention provides many improvements over presently available fuel systems. First, no carbon canister vapor storage device and purge system is required, because no vapor is generated during running or diurnal modes. The small amount of vapor that may be generated is typically handled within the system, however a vent valve 26 is available for venting if excess vapor is generated during refueling if there is a failure in the nozzle system. This results in improved emissions for systems using the present invention during running modes and diurnal cycles.

Second, the present invention provides a second barrier around the liquid fuel 25, which may improve the safety on fuel tank systems.

Third, the present invention is compatible with conventional fueling infrastructures, both manual and robotic. Thus, the fueling system infrastructure will not have to be redesigned to accommodate the present invention, resulting in potential cost savings.

Fourth, the present invention reduces fuel pump 23 current draw in the system 10 because positive pressure is maintained on the bladder 18 during running modes. Further, depending upon the design of the system, there may be applications where the pressure applied to the bladder 18 may be sufficient to deliver fuel 25 to the engine. For example, this could occur during deceleration.

Fifth, because the fuel pump 23 is externally mounted from the fuel tank 12, the present invention limits the amount of energy (in the form of heat) that enters the fuel tank 12. This helps to minimize vapor generation in the fuel tank 12.

Sixth, by providing a thermal barrier 14 to the fuel tank 12, additional protection from vapor generation within the tank 12 is achieved.

Seventh, the present invention extends the amount of time that vapor is contained within the system. In previous systems requiring a carbon canister and purge system, fuel vapor is emitted to the atmosphere when the amount of fuel vapor in the system exceeds the storage capacity of the carbon canister. In the present invention, the length of time would be extended as a function of the maintainability of positive pressure on the bladder and as a function of the time to generate an overpressure condition requiring venting to prevent damage to the system.

While the invention has been described in terms of preferred embodiments, it will be understood, of course, that the invention is not limited thereto since modifications may be made by those skilled in the art, particularly in light of the foregoing teachings. For example, the present invention may be used in a variety of applications that desire minimal or limited vapor generation, such as in a fuel storage tank.

What is claimed is:

1. A fuel storing device for a motor vehicle comprising:
   an exterior shell;
   a flexible bladder disposed in said exterior shell and separating said exterior shell into a fuel storage portion and a space portion, said flexible bladder capable of containing fuel;
   a refueling pipe hermetically sealed to said exterior shell and coupled with said fuel storage portion;
   a fuel delivery pump fluidically coupled with said fuel storage portion, said fuel delivery pump being external from said exterior shell;
   a pressure sensor for monitoring pressure in said space portion;
   an air temperature sensor;
   an air pump coupled to said space portion capable of increasing the pressure within said space portion;
   a vent solenoid relief valve coupled to said space portion for decreasing the pressure within said space portion; and
   a controller electronically coupled to said pressure sensor, said air temperature sensor, said air pump and said vent solenoid relief valve, wherein said controller is capable of directing said air pump to pump air into said space portion to increase pressure in said space portion and is capable of directing said vent solenoid relief valve to open to decrease pressure in said space portion.

2. The fuel storing device of claim 1 further comprising a thermal barrier surrounding said exterior shell.

3. The fuel storing device of claim 1, wherein said flexible bladder is substantially impervious to said fuel.

4. The fuel storing device of claim 3, wherein said flexible bladder is comprised of polytetrafluoroethylene.

5. The fuel storing device of claim 1, wherein said air pump is an electronic air pump.

6. The fuel storing device of claim 1, wherein said air pump is a mechanical air pump.

7. The fuel storing device of claim 1, wherein said flexible bladder has an inner portion, said inner portion substantially coupled to said fuel to prevent vapor generation within said flexible bladder during running modes and diurnal cycles.

8. The fuel storing device of claim 1, wherein said refueling pipe having a vapor recirculation tube and vent valve, said vent valve capable of venting vapor pressure during a refueling process.

9. A method of eliminating vapor generation in a fuel tank having a flexible bladder contained within an exterior shell, where said exterior shell and said flexible bladder define a space portion and a fuel containing portion, the method comprising:
   selectively increasing the pressure in the space portion as a function of a first set of operating conditions;
   selectively decreasing the pressure in the space portion as a function of a second set of operating conditions; and
   selectively holding constant the pressure in the space portion as a function of a third set of operating conditions.

10. The method according to claim 9, wherein the step of selectively increasing the pressure in the space portion as a function of a first set of operating conditions comprises the step of pumping air into the space portion from an air pump as a function of a first set of operating conditions.

11. The method according to claim 10, wherein the step of pumping air into the space portion from an air pump as a function of a first set of operating conditions comprises the step of pumping air into the space portion from an air pump as a function of a fuel level within the flexible bladder, an engine operation mode, and a pressure level within the space portion.

12. The method according to claim 11, wherein the step of pumping air into the space portion from an air pump as a function of a first set of operating conditions comprises the step of pumping air into the space portion from an air pump as a function of a fuel level within the flexible bladder and a pressure level within the space portion when an engine containing the fuel tank is in running mode.

13. The method according to claim 9, wherein the step of selectively decreasing the pressure in the space portion as a function of a second set of operating conditions comprises the step of venting the space portion as a function of a second set of operating conditions.

14. The method according to claim 13, wherein the step the step of venting the space portion as a function of a second set of operating conditions comprises the step of venting the space portion as a function of a fuel level within the flexible bladder, an engine operation mode, and a pressure level within the space portion.

15. The method according to claim 14, wherein the step of venting the space portion as a function of a fuel level within the flexible bladder, an engine operation mode, and a pressure level within the space portion comprises the step of venting the space portion through a vent solenoid relief valve as a function of a fuel level within the flexible bladder and a pressure level within the space portion when an engine containing the fuel tank is in running mode.

16. The method according to claim 13, wherein the step of selectively decreasing the pressure in the space portion as a function of a second set of operating conditions comprises the step of venting the space portion prior to replenishing the fuel tank with fuel.

17. The method according to claim 14, wherein the step the step of venting the space portion prior to replenishing the fuel tank with fuel comprises the step of opening a vent solenoid relief valve to return the space portion to atmospheric pressure.

18. The method according to claim 9, wherein the step of selectively holding constant the pressure in the space portion as a function of a third set of operating conditions comprises the step of holding constant the pressure in the space portion when an engine containing the fuel tank is not running.

* * * * *